United States Patent [19]

Hartmann et al.

[11] Patent Number: 5,541,517
[45] Date of Patent: Jul. 30, 1996

[54] METHOD FOR DRILLING A BOREHOLE FROM ONE CASED BOREHOLE TO ANOTHER CASED BOREHOLE

[75] Inventors: Robin A. Hartmann; Elvira H. Mulder, both of Rijswijk, Netherlands

[73] Assignee: Shell Oil Company, Houston, Tex.

[21] Appl. No.: 369,055

[22] Filed: Jan. 5, 1995

[30] Foreign Application Priority Data

Jan. 13, 1994 [EP] European Pat. Off. ............. 94200074

[51] Int. Cl.$^6$ ............................ G01V 3/08; E21B 25/16
[52] U.S. Cl. ............................................. 324/346; 175/45
[58] Field of Search ........................................ 324/346, 345, 324/347, 323, 66, 67, 326; 175/45, 61, 50; 73/151

[56] References Cited

U.S. PATENT DOCUMENTS

| | | | |
|---|---|---|---|
| 3,725,777 | 4/1973 | Robinson et al. | 324/346 |
| 4,163,324 | 8/1979 | Russell et al. | 33/313 |
| 4,640,352 | 2/1987 | Vanmeurs et al. | 166/245 |
| 4,700,142 | 10/1987 | Kuckes . | |
| 5,103,177 | 4/1992 | Russell et al. | 324/346 |
| 5,172,480 | 12/1992 | Labuc et al. | 324/346 X |
| 5,230,387 | 7/1993 | Waters et al. | 324/346 X |

FOREIGN PATENT DOCUMENTS

| | | |
|---|---|---|
| 0104854A2 | 4/1984 | European Pat. Off. . |
| 0247672A2 | 12/1987 | European Pat. Off. . |
| 0301671 | 2/1989 | European Pat. Off. . |
| 0366567A2 | 2/1990 | European Pat. Off. . |

OTHER PUBLICATIONS

Foreign Search Report dated Apr. 3, 1995.

*Primary Examiner*—Sandra L. O'Shea
*Assistant Examiner*—Roger Phillips

[57] ABSTRACT

In a method for drilling adjacent to a cased known first borehole a second borehole in a predetermined direction the following steps are carried out for a number of along hole depths $d_i$:

measuring components of gravity acceleration and magnetic field (earth & casing);

determining direction parameters $\alpha_i$;

deriving magnetic polestrength components, $B_{p1,i}$ and $B_{p2,i}$;

applying $B_{p1,i}/B_{p2,i}=s_{1,i}/s_{2,i}$ and determining deviations of the predetermined direction; and controlling drilling direction of the second borehole.

16 Claims, 2 Drawing Sheets

METHOD FOR DRILLING A BOREHOLE FROM ONE CASED BOREHOLE TO ANOTHER CASED BOREHOLE

FIELD OF THE INVENTION

The present invention relates to a method for drilling a borehole in a predetermined position to an existing borehole.

BACKGROUND TO THE INVENTION

Drilling a further well or borehole adjacent to already existing wells or boreholes is well-known in the field of oil drilling and production.

In U.S. Pat. No. 3,725,777 a method for determining distance and direction to a cased borehole using magnetic field measurements made from an adjacent borehole is shown. For example in the case of attacking a blowout or drilling multiple wells from a single offshore platform it may be desirable to know the exact location of already existing wells. Such an existing well or borehole is assumed to have a regular periodicity in the casing magnetization. By means of a further assumption of either field data or borehole positions an iterative way of calculation the location of the previously drilled and cased borehole is allowed. However, only final approximate location and field values are obtained.

In EP 247672 a method is disclosed for determining distances between adjacent boreholes. The method of this document is employed in case of a blowout in a previously drilled borehole, a so-called target well, towards which a so-called relief well has to be drilled. In this method accurate magnetic polestrengths values of casing portions have to be known. As a result of complex calculation on Fourier Series of convoluted monopole- and dipole-field functions amplitude/wave number spectra are derived. Such spectra allow determination of the above distances. However, to be capable to apply this method and to obtain such spectra a large number of measurement data is necessary resulting in only mean distances.

Furthermore, from U.S. Pat. No. 4,640,352 it is known to operate a couple of boreholes, the one used as a production well, the other as an injection well. The boreholes were substantially parallel and the problem addressed clearly concerned inducing an economically feasible production of oil from impermeable zones. However, from this document it is not clear how drilling and directing boreholes were carried out.

As to the present invention a quite different problem has to be solved. It will be clear that in the case of a couple of boreholes it may be advantageous to have all the directional data of the production well as soon as the injection well has to be drilled. In such a case it is no longer necessary to previously obtain the data of the first well during drilling the second well.

However, it remains a problem how to control the second borehole drilling operation as accurately as possible and simultaneously to overcome the shortcomings and to avoid the complex operations of the methods as shown above.

Thus, it is an object of the invention to obtain for each depth of a second borehole, when drilled in a predetermined direction adjacent to a first cased borehole having a known position and having casing portions with magnetizations adapted to be measured from the second borehole, a corresponding set of direction drilling data for said second borehole depth.

It is a further object of the invention to prepare directional drilling data immediately employable by the drilling operator for continuing or changing the drilling direction during drilling.

It is yet another object of the invention to check during drilling casing conditions of the first borehole.

SUMMARY OF THE INVENTION

These and other objects are accomplished by a method comprising the steps of:

a) starting drilling the second borehole from a predetermined position $s_o$ in a first coordinate system C;

b) measuring while drilling said second borehole at an along borehole depth $d_i$, in a second borehole related coordinate system D magnetic field components $B_{D,i}$ of $\bar{B}$ and gravity acceleration vector components $g_{D,i}$ of $\bar{g}$;

c) determining from said $\bar{B}$ and $\bar{g}$ components direction parameters $\alpha_i$ of the second borehole;

d) determining from said direction parameters $\alpha_i$ and from magnetic fields $\bar{B}$ and $\bar{B}_E$, $\bar{B}_E$ being the earth's magnetic field, the polestrength components $B_{p1,i}$ and $B_{p2,i}$ of the polestrength vector $\bar{B}_p$, being components of $\bar{B}_p$ at $d_i$ in the first coordinate system C;

e) applying $B_{p1,i}/B_{p2,i}=S_{1,i}/S_{2,i}$, $S_{1,i}$ and $s_{2,i}$ being position parameters in the first coordinate system C, and determining direction parameters deviations $\Delta\beta_i$ with regard to the predetermined direction of the second borehole;

f) comparing said $\Delta\beta_i$ with predetermined deviations $\Delta\beta_i$ and, if $\Delta\beta_i$ is greater than or equal to $\Delta\beta_{0i}$, redirecting the second borehole into said direction; and g) continuing drilling said second borehole in said predetermined direction and repeating steps b) to f) for a further along borehole depth $d_{i+1}$.

The present invention therefore concerns a method for drilling, relative to a neighbor known first borehole which is provided with magnetized casing portions having polestrengths adapted to be measured, a second borehole into a predetermined direction with regard to said first borehole.

DETAILED DESCRIPTION OF THE INVENTION

In each of the figures like numbers are referring to like objects.

Figure 1A:
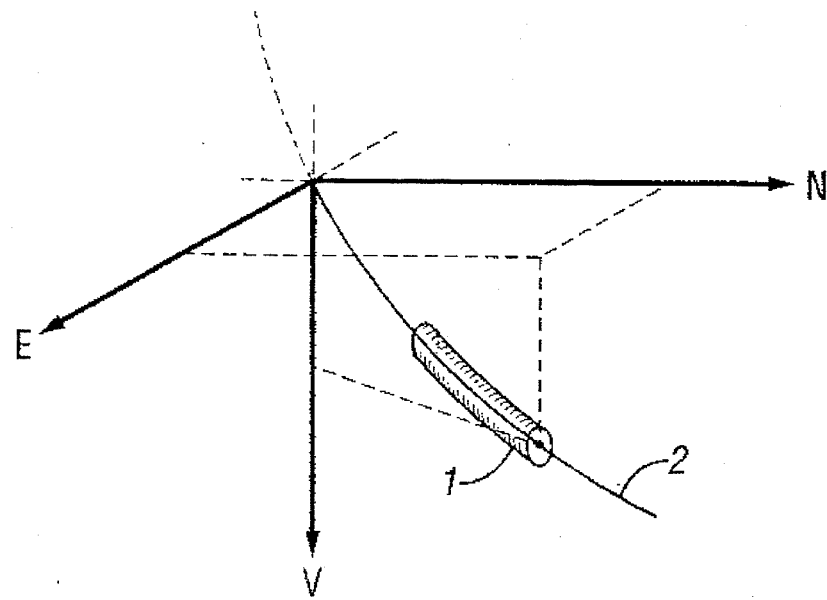
FIGS. 1A and 1B schematically show the orientations of conventionally used coordinate systems when drilling and directing boreholes.
Figure 1B:
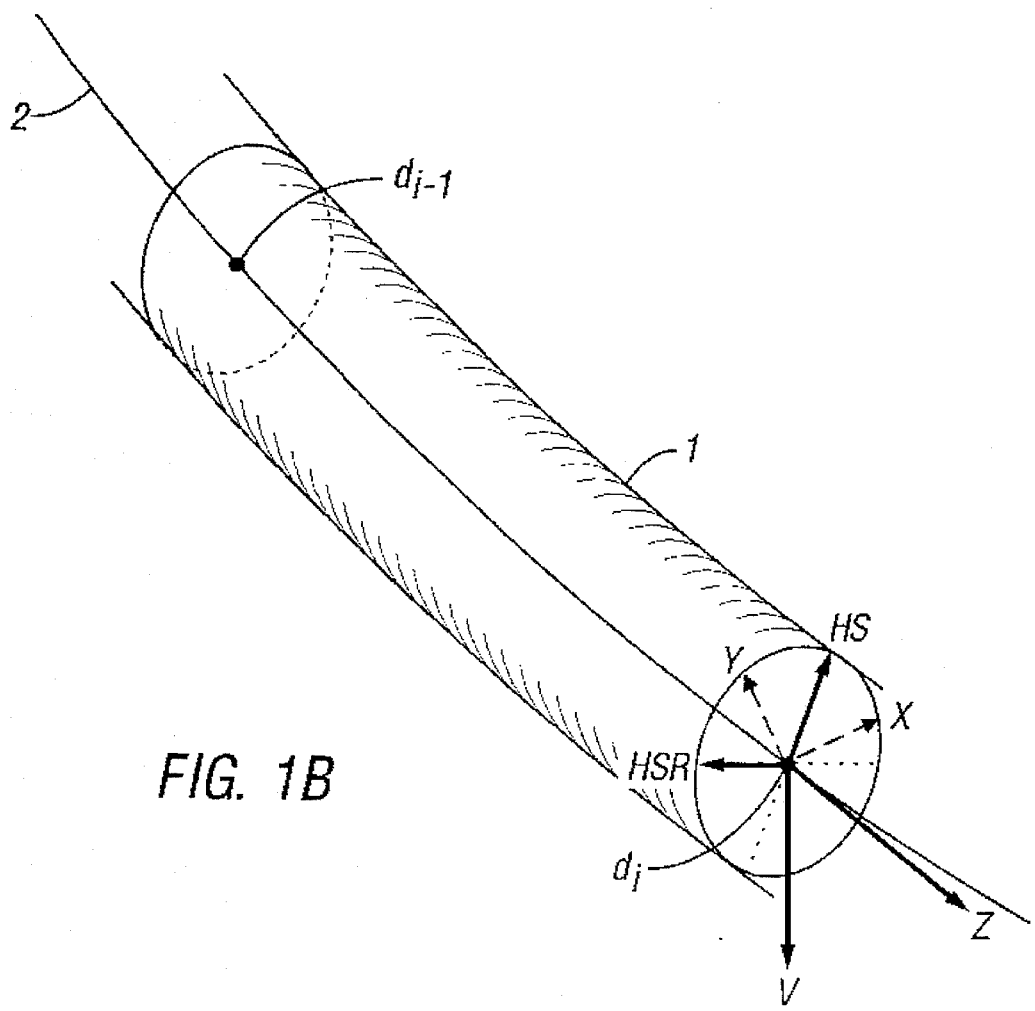

Referring now to FIGS. 1A and 1B, schematic conventionally used coordinate frames or systems as used are shown. In FIG. 1A the earth fixed Cartesian reference frame NEV (North-East-Vertical) is presented wherein a part of a borehole 1 is indicated. The N-direction may be, for example, either the geographical one or the magnetic one. For every other place on earth differences between both frames are well defined. In FIG. 1B an enlarged view of the part of borehole 1 is shown. The borehole 1 is presented as a cylinder around a central or borehole axis 2. Generally, along this axis depth values are taken, often referred to as along hole depths. For a point i a corresponding depth $d_i$ is defined, commonly taken as the distance from the earth surface to said point i along the borehole axis 2. Thus, a sequence of depth values can be presented as . . . $d_{i-2}$, $d_{i-1}$, $d_i$, $d_{i-1}$, $d_{i-2}$, . . . etc. In FIG. 1B exemplary $d_{i-1}$ and $d_i$ depths are shown.

For example for the along borehole depth $d_i$ relevant directions within two coordinate frames are shown. The vertical V is taken from the earth fixed NEV-frame as shown with respect to FIG. 1A. The Cartesian XYZ-frame is generally taken as fixed on a measuring apparatus placed in the borehole 1. In this frame Z can be taken along the borehole axis 2 in the downhole direction and X and Y are taken correspondingly.

Furthermore, at depth $d_i$ the high-side (HS)—and high-side-right (HSR)—directions are shown which are well known to those skilled in the art. HS lies in the vertical plane through Z and V, the latter being in line with the gravity acceleration vector $\bar{g}$. HSR is perpendicular to Z and V and is consequently horizontal.

It may be clear to those skilled in the art that for the general case every other coordinate frame can be used if components can be taken mathematically adequately. Thus, generally two coordinate systems are involved. A first one, C, related to the first borehole and the predetermined direction as mentioned above, and a second D, related to the second borehole. In such frames positions are indicated with parameters s. For example a second borehole has its starting point at $S_0$ in C. For the general case $\bar{B}$ and $\bar{g}$ components in D are indicated with $B_{D,i}$ and $g_{D,i}$ when measured at depth $d_i$.

Figure 2A:
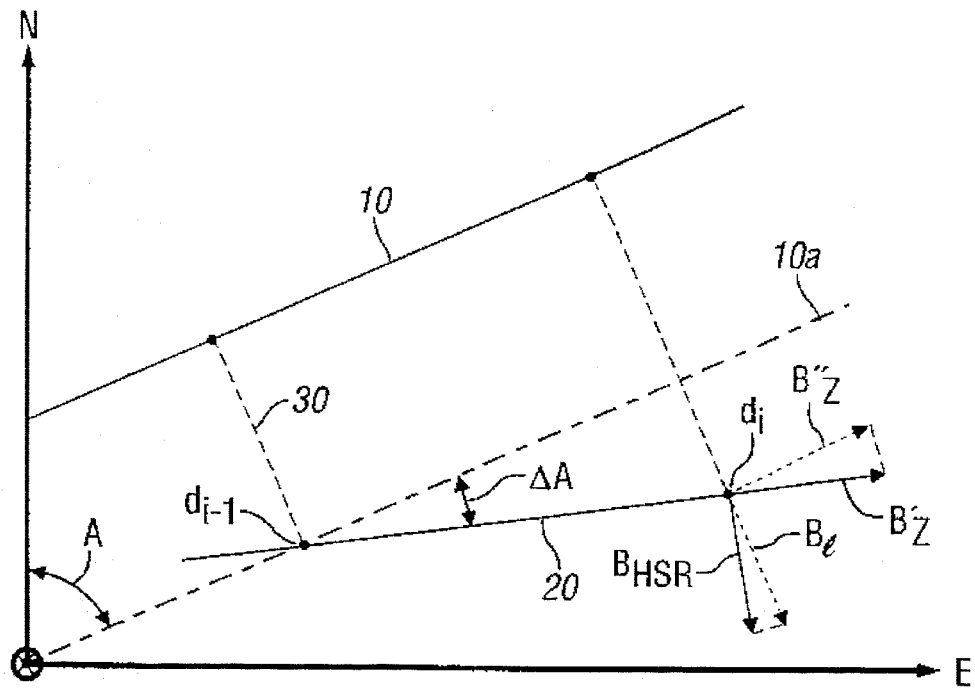
FIGS. 2A and 2B show exemplary measuring situations for determining vector components in two distinct planes within the conventional earth fixed coordinate system.
Figure 2B:
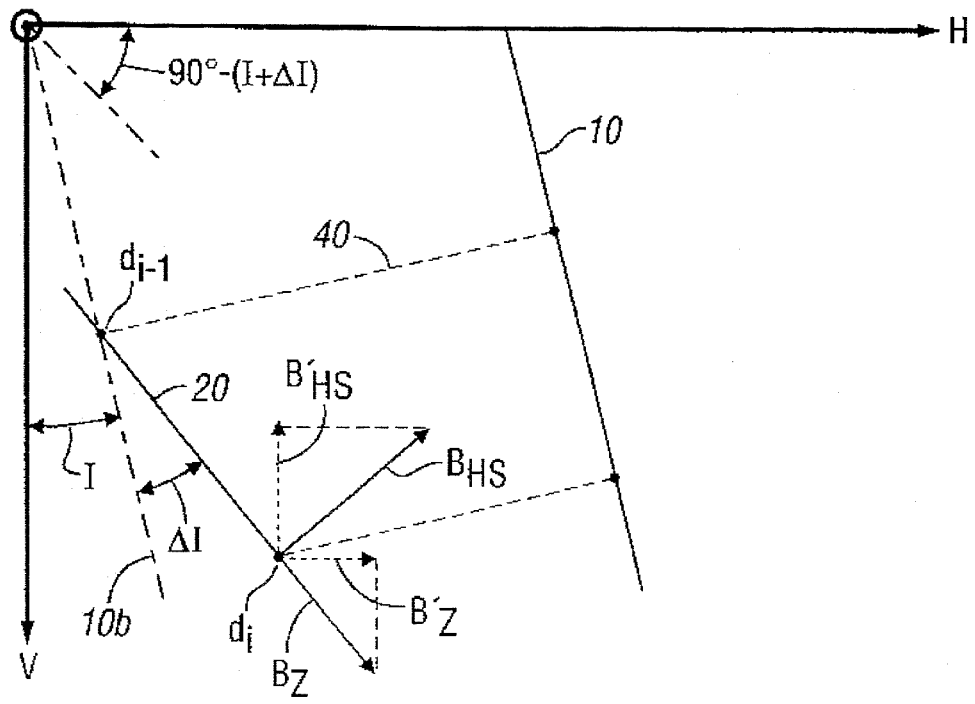

In FIGS. 2A and 2B exemplary measuring situations for conventional coordinate frames as met and to be handled by the present invention are shown.

In FIG. 2A the NE-plane of the NEV-coordinate frame is presented. In the frame-origin the tail of the arrow of the V-vector which is pointing downwards from the NE-plane is faced. Orthogonal projections of a first borehole 10 and a second borehole 20 upon the NE-plane are shown.

The angle between the direction of the first borehole 10 and the N-direction is known as the azimuth-angle A. If for example the predetermined direction for the second borehole 20 is the parallel direction indicated as a dotted line 10a in the NE-plane, then in this FIG. 2A borehole 20 is deviating under a deviation angle DA from said direction. The distance between a point, taken in the second borehole 20, and the first borehole 10 is called the lateral distance 30, l.

In FIG. 2B a vertical section or vertical plane in the NEV-coordinate frame through V and through a vector H in the horizontal NE-plane is presented. In the frame-origin the tip of the arrow of the E-vector which is pointing up from said plane, indicated as HV-plane, is faced. Orthogonal projections of a first borehole 10 and a second borehole 20 upon the HV-plane are shown.

The angle between the direction of the first borehole 10 and the V-direction is known as the inclination-angle I. If, for example, the predetermined direction of the second borehole 20 is the parallel direction, indicated as a dotted line 10b in the HV-plane, then in this FIG. 2B borehole 20 is deviating under a deviation angle $\Delta I$ from said direction slightly upwards.

The distance between a point, taken in the second borehole 20, and the first borehole 10 is called the upward distance 40, u.

Referring to the above explained figures now the present invention will be presented in detail. As the predetermined direction into which the second borehole 20 has to be drilled, the direction parallel to borehole 10 is chosen. Consequently the orthogonal projections of said parallel direction within the NE-plane and the HV-plane, respectively 10a and 10b are parallel with the orthogonal projections of borehole 10. It may be clear to those skilled in the art that any predetermined direction can be chosen. Thus, consequent modifications in determinations, calculations and derivations of formulas and equations are comprised herewith.

In order to arrive at the predetermined direction during drilling the second borehole 20 adjacent to the first borehole 10 suitable measurements have to be made to carry out the necessary calculations and determinations and to control the drilling operations.

Because the first borehole 10 has been provided with magnetized casing portions having polestrengths adapted to be measured over the interborehole distance, magnetic field components $B_x$, $B_y$, $B_z$ of the magnetic field vector $\bar{B}$ are measured from the second borehole by means of a set of magnetometers aligned along the X, Y and Z-axis of the above said XYZ-coordinate frame, which is fixed to the measuring tool as arranged within the second borehole 20. Said magnetic field components generally are composed of polestrength components and earth magnetic field components.

Generally, to be able to couple unequivocally the magnetic field components as measured within the second borehole 20 to the positional data of the first borehole 10 either the absolute polestrength data of the casing portions, or the directional data, or both have to be measured. However, it is very difficult to obtain absolute polestrength data mainly because of the fact that magnetic polestrength values can be changed more or less during arranging the casing portions, which is considered a rather rough operation. Thus, it is clear to those skilled in the art that advantageously the gravity acceleration components $g_x$, $g_y$, and $g_z$, of the gravity acceleration vector $\bar{g}$ are measured to allow the determination of directional data. Furthermore, it is a very well known technique to apply a set of accelerometers within a borehole measurement tool.

Surprisingly, it has appeared that, having only gravity acceleration components and magnetic field components, the latter including only non-calibrated polestrength values, according to the present invention in particular azimuth angles and deviation angles in azimuth and inclination can be derived, allowing an accurate control operation as to the directional drilling operation of the second borehole. The following procedure is followed.

After having measured values of $B_{xi}$, $B_{yi}$, $B_{zi}$, $g_{xi}$, $g_{yi}$, and $g_{zi}$ at any depth $d_i$ it is very well known to obtain inclination angles and high side angles as shown for example in U.S. Pat. No. 4,163,324. In the present case the determined angles for the second borehole 20 are $(I+\Delta I)_i$ and $(A+\Delta A)_i$ at such a depth $d_i$.

Having the angles and magnetic field components, the following route is followed to arrive at $A_i$ and $\Delta A_i$ and $\Delta_i$ values.

The inclination and highside angles as obtained above allow to arrive at highside (HS) and highside right (HSR) components in a straight-forward way which is visualized in FIG. 1B. Thus, the magnetic field components to be handled are changed from $B_x$, $B_y$, and $B_z$ to $B_{HS}$, $B_{HSR}$ and $B_z$.

Because the drilling operations and the magnetic field measurements are clearly coupled to first borehole characteristics, further determination and calculation procedures are focused on vector components and interborehole distances closely related thereto. Consequently this means that, besides the angles mentioned above, components and distances in the upward and lateral directions with respect to the first borehole are determined. These directions correspond respectively with the HS and HSR direction of the first borehole and they are directed along dashed lines 40 and 30 in FIGS. 2B and 2A respectively.

For an arbitrary drilling direction for the second borehole 20 which direction may be close to the predetermined direction such as the parallel direction presented as 10a and 10b in FIGS. 2A and 2B respectively, neither the $\Delta A$ direction in FIG. 2A, nor the direction in FIG. 2B will be in spatial alignment with the corresponding first borehole projection in the HV-plane in FIG. 2B or the NE-plane in FIG. 2A respectively. Therefore a first rotation over $(90°-(I+\Delta I))$ as presented in FIG. 2B is carried out in order to obtain components in the horizontal NE-plane thus providing a clear azimuthal reference.

Because $B_{HSR}$ lies in the NE plane per se only $B_z$ and $B_{HS}$ as shown in FIG. 2B are subjected to the $(90°-(I+\Delta I))$ rotation, resulting in the following components, $$B'_z = B_z \sin(I+\Delta I) + B_{HS} \cos(I+\Delta I) \quad (1)$$

and $$B_{HS}' = -B_z \cos(I+\Delta I) + B_{HS} \sin(I+\Delta I) \quad (2).$$

$B_z'$ and $B_{HS}'$ are also shown in FIG. 2B.

Now having been arrived in the NE plane the new situation is sketched in FIG. 2A. As explained above $B_{HSR}$, already positioned in the horizontal plane, and $B_z'$ are shown whereas $B_{HS}'$ has to be thought of as pointing upward from this horizontal plane. In this NE plane a further rotation over $\Delta A$ is carried out, i.e. from the HSR direction of the second borehole to the HSR or lateral (1) direction of the first borehole.

Thus, the following components will result, $$B_z'' = B_z' \cos \Delta A - B_{HSR} \sin \Delta A \quad (3),$$

and $$B_{HSR}' = B_z' \sin \Delta A + B_{HSR} \cos \Delta A \quad (4),$$

both components also being shown in FIG. 2A.

In a further step a clear inclinational reference is obtained. A rotation over $(90°-I)$ is carried out in order to arrive at line 10b in FIG. 2B whereas the components obtained thus far are already in spatial alignment with the azimuth direction. This rotation applied on $B_z''$ and $B_{HS}'$ results in, $$B'_z{}'' = B_z'' \sin I - B'_{HS} \cos I \quad (5),$$

and $$B''_{HS} = B_u = B''_z \cos I + B'_{HS} \sin I \quad (6),$$

thus obtaining the component in the upward (u) direction.

In $B_1$ and $B_u$, (4) and (6) respectively, the initial $B_{HS}$, $B_{HSR}$, and $B_z$ can be substituted, giving, $$B_1 = [B_z \sin(I+\Delta I) + B_{HS} \cos(I+\Delta I)] \sin \Delta A + B_{HSR} \cos \Delta A \quad (7),$$

and $$B_u = \{[B_z \sin(I+\Delta I) + B_{HS} \cos(I+\Delta I)] \cos \Delta A - B_{HSR} \sin \Delta A\} \cos I + \{-B_z \cos(I+\Delta I) + B_{HS} \sin(I+\Delta I)\} \sin I \quad (8).$$

In the present case only small deviations are assumed. For the further determinations this means that $\Delta A$ is small, and consequently the approximations $\cos \Delta A = 1$ and $\sin \Delta A = \Delta A$ are employed. Applying these approximations and well known basic trigonometrics the following results, $$B_1 = [B_z \sin(I+\Delta I) + B_{HS} \cos(I+\Delta I)] \Delta A + B_{HSR} \quad (9),$$

and $$B_u = B_z \sin \Delta I + B_{HS} \cos \Delta I - B_{HSR} \cos I \Delta A \quad (10).$$

As usual the components measured, i.e. $B_x$, $B_y$, $B_z$, subsequently transferred to the $B_{HS}$, $B_{HSR}$, $B_z$ frame, and making up $B_u$ and $B_1$, include both the earth magnetic field $\bar{B}_E$ and the magnetic polestrength $\bar{B}_p$ of the casing portions in accordance with.

$$\bar{B} = \bar{B}_p + \bar{B}_E \quad (11)$$

In order to arrive at well defined polestrength components $B_{p,u}$, $B_{p,1}$ in the upward and lateral direction the measured components have to be corrected for the earth magnetic field $\bar{B}_E$.

Conventionally, the earth magnetic field is characterized by its components in the north and vertical direction, $B_N$ and $B_V$ respectively, which are known for most places on earth. Generally, by subjecting these $B_N$ and $B_V$ to well known rotations to the I-A coordinate system the following components in the HS, HSR and Z direction are obtained:

$$B_{E,HS} = -B_V \sin I + B_N \cos A \cos I \quad (12),$$

$$B_{E,HSR} = -B_N \sin A \quad (13),$$

and $$B_{E,Z} = B_V \cos I + B_N \cos A \sin I \quad (14).$$

In particular the components in the upward (u, HS) and lateral (1, HSR) direction, respectively 12 and 13, can be combined easily with the above l- and u- $\bar{B}$ field components, respectively 9 and 10, which are also obtained for the I-A coordinate system, to arrive at the above said well-defined polestrength components.

Thus, when employing $$\bar{B}_p = \bar{B} - \bar{B}_E \quad (11'),$$

the following polestrength components are obtained, $$B_{p,u} = B_z \sin \Delta I + B_{HS} \cos \Delta I - B_{HSR} \cos I \Delta A + B_V \sin I - B_N \cos I \cos A \quad (15),$$

and $$B_{p,L} = \{B_z \sin(I+\Delta I) + B_{HS} \cos(I+\Delta I)\} \Delta A + B_{HSR} + B_N \sin A \quad (16).$$

As to the polestrengths of the casing portions of the first borehole the following is noted. In most cases the casing parts are magnetized before being arranged in the borehole to form the casing of a production well. Such magnetizing is known for example from EP 301671, the disclosure of which is incorporated herein by reference. As a result a sequence of magnetic poles, couples of which functioning as bar magnets, is obtained. Such a casing is adapted to be used as a mark for example when in case of a blowout a relief well has to be drilled. However, as set forth above, during arranging the casing parts in the borehole, rough operating conditions occur. Consequently the well defined casing magnetizations are distorted substantially. Moreover, the magnetic material is subjected to the earth magnetic field. Dependent on location and direction, either the material is magnetized per se, or the magnetization already applied is modified. In view of the foregoing it will be clear that in many cases real magnetization values of casing portions are not known.

Besides, the casing parts which are assumed to be coupled like bar magnets along a substantially straight line, allow the approximation as a sequence of magnetic monopoles which is well known in basic physics. This means that for each depth $d_i$ the lateral and upward polestrength field value can be expressed as, $$B_{p,l_i} = \sum_{k=1}^{N} \frac{P_k}{4\pi} \frac{l_i}{[l_i^2 + u_i^2 + (z-z_k)^2]^{3/2}}, \quad (17)$$

and $$B_{p,u_i} = \sum_{k=1}^{N} \frac{P_k}{4\pi} \frac{u_i}{[l_i^2 + u_i^2 + (z-z_k)^2]^{3/2}}, \quad (18)$$

$P_k$ being the polestrength at position $z_k$ along the first borehole, and ($z-z_k$) being the distance between $z_k$ and $z=0$ with $z=0$ being the point of closest approach between the first borehole and the measuring tool in the second borehole.

In accordance with the invention the following formula results, $$B_{p,l_i}/B_{p,u_i} = l_i/u_i \quad (19).$$

Thus, advantageously any polestrength value is now eliminated and any further determination employing this relation is independent on the magnetizations of the sequence of magnetic poles.

Referring again to FIGS. 2A and 2B for angles $\Delta A$ and $\Delta I$ the lateral and upward distance at depth $d_i$ can be written as, $$l_i = l_{i-1} + (d_i - d_{i-1}) \cdot \Delta A \quad (20),$$

and $$u_i = u_{i-1} + (d_i - d_{i-1}) \cdot \sin \Delta I \quad (21),$$

with $\Delta A$ small, and $l_{i-1}$ and $u_{i-1}$ being the lateral and upward distance at the previous measuring point $d_{i-1}$.

Rewriting (15) and (16) for depth $d_i$ to:

$$B_{p,u_i} = B_{u1} \cdot \Delta A_i + B_{u2} \quad (15'),$$

and $$B_{p,l_i+i=B} l_1 \cdot \Delta A_i + B_{l2} \quad (16'),$$

and employing (19) to (21), then the following result is obtained, $$\Delta A_i = \frac{B_{u2} l_{i-1} - B_{l2} u_i}{B_{l1} u_i - B_{u1} l_{i-1} - B_{u2}(d_i - d_{i-1})}. \quad (22)$$

From the above it will be clear that all the directional data for the second borehole at $d_i$ have been obtained now, since:

$\Delta I$ is known from combining I and (I+$\Delta I$), $\Delta A$ is determined as shown above, and (A+$\Delta A$) being the azimuth angle of the second borehole is determined from adding $\Delta A$ to A.

If a specific drilling operation necessitates to have the distance between the boreholes, then:

the upward distance $u_i$ has been determined already as shown above, and the lateral distance $l_i$ can be derived advantageously from the above (20) with filling in $\Delta A$ as obtained from (22).

In a next step of the present invention the directional data obtained as shown above have to be compared with the data of the predetermined direction. This means that the obtained $\Delta A_i$ and $\Delta I_i$ should not exceed predetermined ranges $\Delta A_{0i}$ and $\Delta I_{0i}$. Preferably $\Delta A_{0i}$ and $\Delta I_{0i}$ are chosen at most 10.

Dependent on this comparison, either the drilling operation can be continued in the direction followed thus far, or the drilling direction may be corrected in lateral direction, upward direction, or both directions.

Referring again to the general case as mentioned above, direction parameters $\alpha_i$ are determined from $B_{D,i}$ and $g_{D,i}$, which step allows the determination of $B_{p1,i}$ and $B_{p2,i}$ for the polestrengths with $B_E$ taking into account. Then the following general equation can be formulated, $$B_{p1,i}/B_{p2,i} = S_{1,i}/S_{2,i} \quad (23),$$

with $S_{1,i}$ and $S_{2,i}$ being position parameters in C. Consequently deviations $\Delta \beta_i$ are compared with $\Delta \alpha_{0i}$ allowing the same control procedure as given for the conventional frames. When starting the method of the present invention in the above general frames C and D, such C and D can be chosen freely. For example only for C the conventional NEV frame can be taken. Furthermore, separately, for D the XYZ frame, or even cylindrical coordinates, can be taken. In the same way parameters $\alpha_i$ can be chosen, although I, A, HS, and HSR as explained above are the usual ones.

In a further embodiment the method of the present invention advantageously allows the determination of strength and direction of magnetizations of casing portions. Thus, substantial distortions and/or deviations in magnetization can provide useful information on casing conditions.

Moreover, if at starting the drilling operations the polestrengths are known, drilling operations can be carried out in close dependency to said strengths whereas the method of the invention advantageously allows a check procedure as to the directional data obtained.

In the above explanation of the method of the invention clearly the reference direction of the second borehole, which is considered the predetermined direction, is parallel to that of the first borehole. Thus, a couple of requirements for carrying out the method of the present invention are fulfilled easily. Firstly directional data for the predetermined direction of the second borehole are identical to the known ones. Secondly magnetizations can be assumed being adapted to be measured along the whole trajectory.

If for some reason the predetermined direction of the second borehole is not parallel to that of the first borehole the same method as explained above can be applied advantageously. Again A and I angles are set for making up the predetermined direction, and by employing (19) the method of the present invention can be applied with great advantage. In that case one has to realize that the distance between the boreholes should not become too large because of the measurability of the polestrength.

In this field of technique it is well known that dependent on type of casing strengths having a magnetic flux up to 18000 $\mu$Wb can be obtained allowing measuring magnetic flux densities not lower than 2 $\mu$T. This means that lateral or upward distance may not exceed about 30 m.

In a preferred embodiment of the present invention $1_i/u_i$ is less than or equal to 1. Thus, consequences of errors in the determination of $\Delta A$ are minimized which can be seen from (19).

Furthermore the method of the present invention as explained above can be used for verifying direction and position of a second uncased borehole near a first borehole which has an accurately known position and which is provided with magnetized casing portions having polestrengths adapted to be measured from the first borehole. In this case the measuring while drilling is clearly substituted by measuring from a borehole already drilled.

Besides the above advantageously the method of the present invention as explained above can be employed for determining direction and position of a first cased borehole provided with magnetized casing positions having polestrengths adapted to be measured from a second uncased borehole having an accurately known position. For example, when the second borehole is accurately drilled by means of gyro drilling control, then the reverse way of operating can be applied.

Advantageously the method of the invention is employed in drilling couples of holes in shaly-sand layer formations which often necessitate injection of steam in order to arrive at desired production levels.

Various modifications of the present invention will become apparent to those skilled in the art from the foregoing description. Such modifications are intended to fall within the scope of the appended claims.

We claim:

1. A method for drilling, relative to a neighbor known first borehole which is provided with magnetized casing portions having polestrengths adapted to be measured, a second borehole into a predetermined direction with regard to the first borehole, the method comprising the steps of:

a) starting drilling the second borehole from a predetermined position $s_0$ in a first coordinate system C;

b) measuring, while drilling the second borehole at and along borehole depth $d_i$, in a second borehole related coordinate system D, magnetic field components $B_{D,i}$ of magnetic field vector $\overline{B}$ and gravity acceleration vector components $g_{D,i}$ of gravity acceleration vector $\overline{g}$;

c) determining from the $\overline{B}$ and $\overline{g}$ components, $B_{D,i}$ and $g_{D,i}$, respectively, direction parameters $\alpha_i$ of the second borehole in the first coordinate system C;

d) determining from the direction parameters $\alpha_i$ and from magnetic fields $\overline{B}$ and $\overline{B}_E$, $\overline{B}_E$ being the earth's magnetic field, at least two polestrength components $B_{p1,i}$ and $B_{p2,i}$ of a polestrength vector $\overline{B}_p$, $B_{p1,i}$ and $B_{p2,i}$ being components of $\overline{B}_p$ at $d_i$ in the first coordinate system C;

e) applying $B_{p1,i}/B_{p2,i} = s_{1,i} s_{2,i}$, wherein $s_{1,i}$ and $s_{2,i}$ are position parameters in the first coordinate system C corresponding to the location of the second wellbore with respect to the first wellbore, and determining direction parameter deviations, $\Delta\beta_i$ with regard to the predetermined direction of the second borehole;

f) comparing the $\Delta\beta_i$ with the predetermined direction parameter deviations $\Delta\beta_{0i}$, and, if $\Delta\beta_i$ is greater than $\Delta\beta_{0i}$, redirecting the second borehole into the predetermined direction; and g) continuing drilling the second borehole in the predetermined direction and repeating steps b) to f) for a further along borehole depth $d_{i+1}$.

2. The method of claim 1 wherein the predetermined direction of the second borehole is parallel to the direction of the neighbor known first borehole.

3. The method of claim 1 wherein the predetermined direction of the second borehole is substantially horizontal.

4. The method of claim 1 wherein the first coordinate system C is the earth fixed Cartesian coordinate system NEV, with N along the north, V along the vertical, and E along the east direction.

5. The method of claim 1 wherein the second coordinate system D is the Cartesian coordinate system XYZ with Z along the downhole axis.

6. The method of claim 1 wherein the direction parameters $\alpha_i$ are inclination angle and highside angle.

7. The method of claim 1 wherein:

the polestrength components $B_{p1,i}$ and $B_{p2,i}$ are $B_{p,li}$ and $B_{p,ui}$ respectively being the component in the NE plane in the direction of lateral distance $l_i$ from the second to the first borehole, and the component in the plane through $\overline{Z}$ and $\overline{g}$ in the direction of upward distance $u_i$ from the second to the first borehole, $$B_{p,li}/B_{p,ui} = l_i/u_i,$$

and deviations $\Delta\beta_i$ with regard to the predetermined directions are $\Delta I_i$ and $\Delta A_i$, respectively being deviations in inclination I and in azimuth A.

8. The method of claim 7 wherein the predetermined deviation angles $\Delta I_{0i}$ and $\Delta A_{0i}$ are equal to or less than about 10°.

9. The method of claim 7 wherein $l_i/u_i$ is less than or equal to one.

10. The method of claim 1 wherein the polestrengths are monopole fields of subsequent casing portions.

11. The method of claim 7 wherein $B_{p,li}$ and $B_{p,ui}$ are determined from combining components of $\overline{B}$ and $\overline{B}_E$ in the Cartesian coordinate frame defined along a highside (HS) direction, a highside right (HSR) direction, and a downward borehole axis (Z).

12. The method of claim 11, wherein the deviation in azimuth angle from the predetermined direction is determined in accordance with:

$$\Delta A_i = \frac{B_{u2}l_{i-1} - B_{l2}u_i}{B_{l1}u_i - B_{u1}l_{i-1} - B_{u2}(d_i - d_{i-1})},$$

with $B_{l1} = B_z \sin(I+\Delta I) + B_{HS} \cos(I+\Delta I),$ $B_{l2} = B_{HSR} + B_N \sin A,$ $B_{u1} = -B_{HSR} \cos I,$ $B_{u2} = B_z \sin \Delta I + B_{HS} \cos \Delta I + B_V \sin I - B_N \cos I \cos A,$ and $B_N$ and $B_V$ being the north and vertical components, respectively, of the earth magnetic field, and all the angles and components being measured and determined at $d_i$ and $d_{i-1}$ and $l_{i-1}$ being the along borehole depth and lateral distance of the previous measurement.

13. The method of claim 7, wherein the lateral and upward distance are determined in accordance with:

$l_i = l_{i-1} + (d_i - d_{i-1}) \cdot \Delta A,$ and $u_i = u_{i-1} + (d_i - d_{i-1}) \cdot \sin \Delta I,$ $u_{i-1}$ being the upward distance of the previous measurement.

14. The method of claim 7 wherein $B_{p,li}$ and $B_{p,ui}$ values are determined.

15. The method of claim 14 wherein the $B_{p,li}$ and $B_{p,ui}$ values are used for detection of distortions in polestrengths as arranged.

16. A method for verifying direction and position of a second uncased borehole situated near a first borehole having an accurately known position and provided with magnetized casing portions having polestrengths adapted to be measured from the second borehole, the method comprising the steps of:

a) determining a starting position $s_0$ of the second uncased borehole in a first coordinate system C;

b) measuring, the second uncased borehole at and along borehole depth $d_i$, in the second borehole related coordinate system D, magnetic field components $B_{D,i}$ of magnetic field vector $\overline{B}$ and gravity acceleration vector components $g_{D,i}$ of gravity acceleration vector $\overline{g}$;

c) determining from the $\overline{B}$ and $\overline{g}$ components, $B_{D,i}$ and $g_{D,i}$, respectively, direction parameters $\alpha_i$ of the second borehole in the first coordinate system C;

d) determining from the direction parameters $\alpha_i$ and from magnetic fields $\overline{B}$ and $\overline{B}_E$, $\overline{B}_E$ being the earth's magnetic field, at least two polestrength components $B_{,p1,i}$ and $B_{p,2i}$ of a polestrength vector $\overline{B}_p$, $B_{p1,i}$ and $B_{p2,i}$ being components of $\overline{B}_p$ at $d_i$ in the first coordinate system C;

e) applying $B_{,p1,i}/B_{p2,i} = s_{1,i}/s_{2,i}$, wherein $s_{1,i}$ and $s_{2,i}$ are position parameters in the first coordinate system C corresponding to the location of the second wellbore with respect to the first wellbore, and differential direction parameter deviations, $\Delta\beta_i$; and f) adding $\Delta\beta_i$ to the known starting positions to verify the direction and position of the second uncased borehole.

* * * * *